(12) United States Patent
Tamura et al.

(10) Patent No.: US 9,008,494 B2
(45) Date of Patent: Apr. 14, 2015

(54) REPRODUCTION UNIT, REPRODUCTION METHOD, AND PROGRAM

(75) Inventors: Toshitaka Tamura, Saitama (JP); Tsunemitsu Takase, Tokyo (JP); Takafumi Azuma, Tokyo (JP); Yasushi Ikeda, Kanagawa (JP); Sou Fujii, Kanagawa (JP)

(73) Assignee: Sony Corporation, Tokyo (JP)

( * ) Notice: Subject to any disclaimer, the term of this patent is extended or adjusted under 35 U.S.C. 154(b) by 188 days.

(21) Appl. No.: 13/167,125

(22) Filed: Jun. 23, 2011

(65) Prior Publication Data

US 2012/0008910 A1 Jan. 12, 2012

(30) Foreign Application Priority Data

Jul. 8, 2010 (JP) .................................. 2010-155720

(51) Int. Cl.
*H04N 5/93* (2006.01)
*H04N 9/82* (2006.01)
*H04N 5/775* (2006.01)
*H04N 5/783* (2006.01)
*H04N 13/00* (2006.01)
*H04N 13/04* (2006.01)
*H04N 5/85* (2006.01)

(52) U.S. Cl.
CPC ............ *H04N 9/8227* (2013.01); *H04N 5/775* (2013.01); *H04N 5/783* (2013.01); *H04N 5/85* (2013.01); *H04N 13/0055* (2013.01); *H04N 13/0066* (2013.01); *H04N 13/0456* (2013.01)

(58) Field of Classification Search
None
See application file for complete search history.

(56) References Cited

U.S. PATENT DOCUMENTS 7,991,105 B2 * 8/2011 Mielekamp et al. ............. 378/4
8,140,390 B2 * 3/2012 Cansler et al. ............. 705/14.49
8,548,308 B2 * 10/2013 Okubo et al. ................. 386/343

FOREIGN PATENT DOCUMENTS

JP      2004-328566      11/2004

OTHER PUBLICATIONS

U.S. Appl. No. 13/187,708, filed Jul. 21, 2011, Takase, et al.

* cited by examiner

*Primary Examiner* — William C Vaughn, Jr.
*Assistant Examiner* — Daniel Tekle
(74) *Attorney, Agent, or Firm* — Oblon, McClelland, Maier & Neustadt, L.L.P.

(57) ABSTRACT

The reproduction unit includes a reproducing unit that reproduces three-dimensional (3D) content recorded on a content recording medium, and a display control unit that displays a two-dimensional (2D) image of the 3D content on a parent screen having a predetermined size within a display screen when an interlace operation is executed with respect to a 3D image of the 3D content during reproduction by the reproducing unit, and displays the 3D image of the 3D content on a child screen having a size smaller than the predetermined size within the display screen.

8 Claims, 5 Drawing Sheets

FIG. 3A index.bdmv-Syntax

| Syntax | No. of bits | Mnemonic |
|---|---|---|
| index.bdmv{ | | |
|     type_indicator | 8*4 | bslbf |
|     version_number | 8*4 | bslbf |
|     Indexes_start_address | 32 | uimsbf |
|     ExtensionData_start_address | 32 | uimsbf |
|     reserved_for_future_use | 192 | bslbf |
|     AppInfoBDMV() | | |
|     for(i=0;i<N1;i++){ | | |
|         padding_word | 16 | bslbf |
|     } | | |
|     Indexes() | | |
|     for(i=0;i<N2;i++){ | | |
|         padding_word | 16 | bslbf |
|     } | | |
|     ExtensionData() | | |
|     for(i=0;i<N3;i++){ | | |
|         padding_word | 16 | bslbf |
|     } | | |
| } | | |

FIG. 3B

AppInfoBDMV_Syntax

| Syntax | No. of bits | Mnemonic |
|---|---|---|
| APPInfoBDMV{ | | |
|     length | 32 | uimsbf |
|     reserved_for_future_use | 1 | bslbf |
|     initial_output_mode_preference | 1 | bslbf |
|     SS_content_exist_flag | 1 | bslbf |
|     reserved_for_future_use | 5 | bslbf |
|     video_format | 4 | bslbf |
|     frame_rate | 4 | bslbf |
|     content_provider_user_data | 8*32 | bslbf |
| } | | |

FIG. 4A
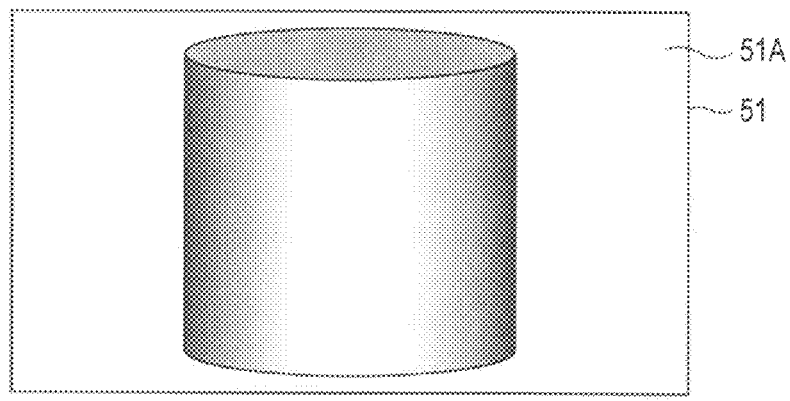
FIG. 4B
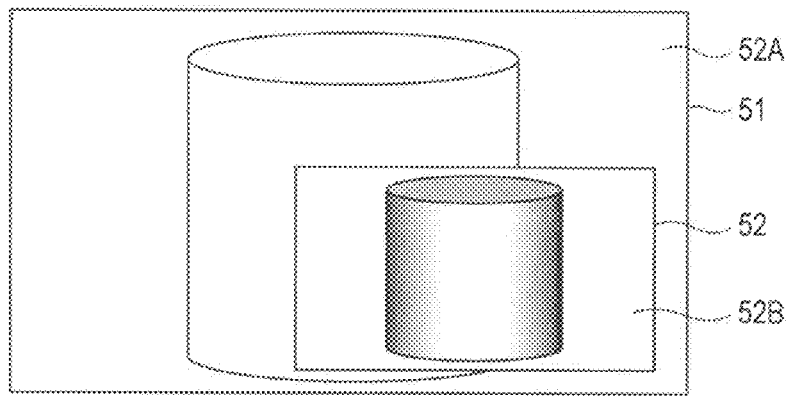

REPRODUCTION UNIT, REPRODUCTION METHOD, AND PROGRAM

BACKGROUND

The present disclosure relates to a reproduction unit, a reproduction method, and a program, and more particularly, to a reproduction unit, a reproduction method, and a program, in which a user can recognize a three-dimensional (3D) image without a sense of unease when an interlace operation during reproduction of 3D content is executed.

Recently, 3D movie systems in which an image is able to be three-dimensionally perceived have received publicity. In addition, sales of TV (television) receivers capable of viewing 3D images have begun, and the viewing of the 3D images has begun in earnest.

In a case in which 3D content is reproduced by a reproduction apparatus, only one of the images for the left and right eyes is displayed as a 2D image while performing fast-rewinding reproduction or fast-forwarding reproduction.

Meanwhile, in the related art, a technology (for example, see Japanese Unexamined Patent Application Publication No. 2004-328566) in which the parallax amount is gradually increased at the time of switching from 2D display to 3D display to thereby switch to the 3D display without a feeling of incongruity has been disclosed.

SUMMARY

As described above, while performing the fast-rewinding reproduction or the fast-forwarding reproduction, only the 2D image is displayed. Due to this, it is difficult to recognize the 3D image. Thus, when a position enabling a user to sufficiently enjoy the 3D image is searched for by the user while performing the fast-rewinding reproduction or the fast-forwarding reproduction, since there has been a switch to regular reproduction, it is difficult to view the 3D image from the position.

Meanwhile, in a case in which only the 3D image is displayed while fast-rewinding reproduction or fast-forwarding reproduction is performed, it is difficult for the user to cope with the change in the parallax amount, thereby causing unease.

The present disclosure is to solve the above problem, and it is desirable to enable a user to recognize a 3D image without a sense of unease when an interlace operation during reproduction of 3D content is executed.

According to an embodiment of the present disclosure, there is provided a reproduction unit, including: a reproducing unit that reproduces 3D content recorded on a content recording medium; and a display control unit that displays a 2D image of the 3D content on a parent screen having a predetermined size within a display screen when an interlace operation is executed with respect to a 3D image of the 3D content during reproduction by the reproducing unit, and displays the 3D image of the 3D content on a child screen having a size smaller than the predetermined size within the display screen.

According to another embodiment of the present disclosure, there is provided a reproduction method operated by a reproduction unit that reproduces 3D content recorded on a content recording medium, the method including: displaying a 2D image of the 3D content on a parent screen having a predetermined size within a display screen when an interlace operation is executed with respect to a 3D image of the 3D content during reproduction; and displaying the 3D image of the 3D content on a child screen having a size smaller than the predetermined size within the display screen.

According to still another embodiment of the present disclosure, there is provided a program enabling a computer to function as: a reproducing unit that reproduces 3D content recorded on a content recording medium; and a display control unit that displays a 2D image of the 3D content on a parent screen having a predetermined size within a display screen when an interlace operation is executed with respect to a 3D image of the 3D content during reproduction by the reproducing unit, and displays the 3D image of the 3D content on a child screen having a size smaller than the predetermined size within the display screen.

According to the embodiments of the present disclosure, when an interlace operation is executed with respect to the 3D image of the 3D content during reproduction, the 2D image of the 3D content is displayed on the parent screen having a predetermined size within the display screen, and the 3D image of the 3D content is displayed on the child screen having a size smaller than the predetermined size within the display screen.

The reproduction apparatus may be a separate apparatus, or an internal block constituting a single apparatus.

According to the embodiments of the present disclosure, it is possible for a user to recognize the 3D image without a sense of unease when an interlace operation during reproduction of the 3D content is executed.

BRIEF DESCRIPTION OF THE DRAWINGS

FIGS. 3A and 3B are diagrams showing contents of data recorded as the index file;

FIGS. 4A and 4B are diagrams showing an example of a displayed image; and

DETAILED DESCRIPTION OF EMBODIMENTS

[Configuration Example of Reproduction Unit According to the Present Disclosure]

Figure 1:
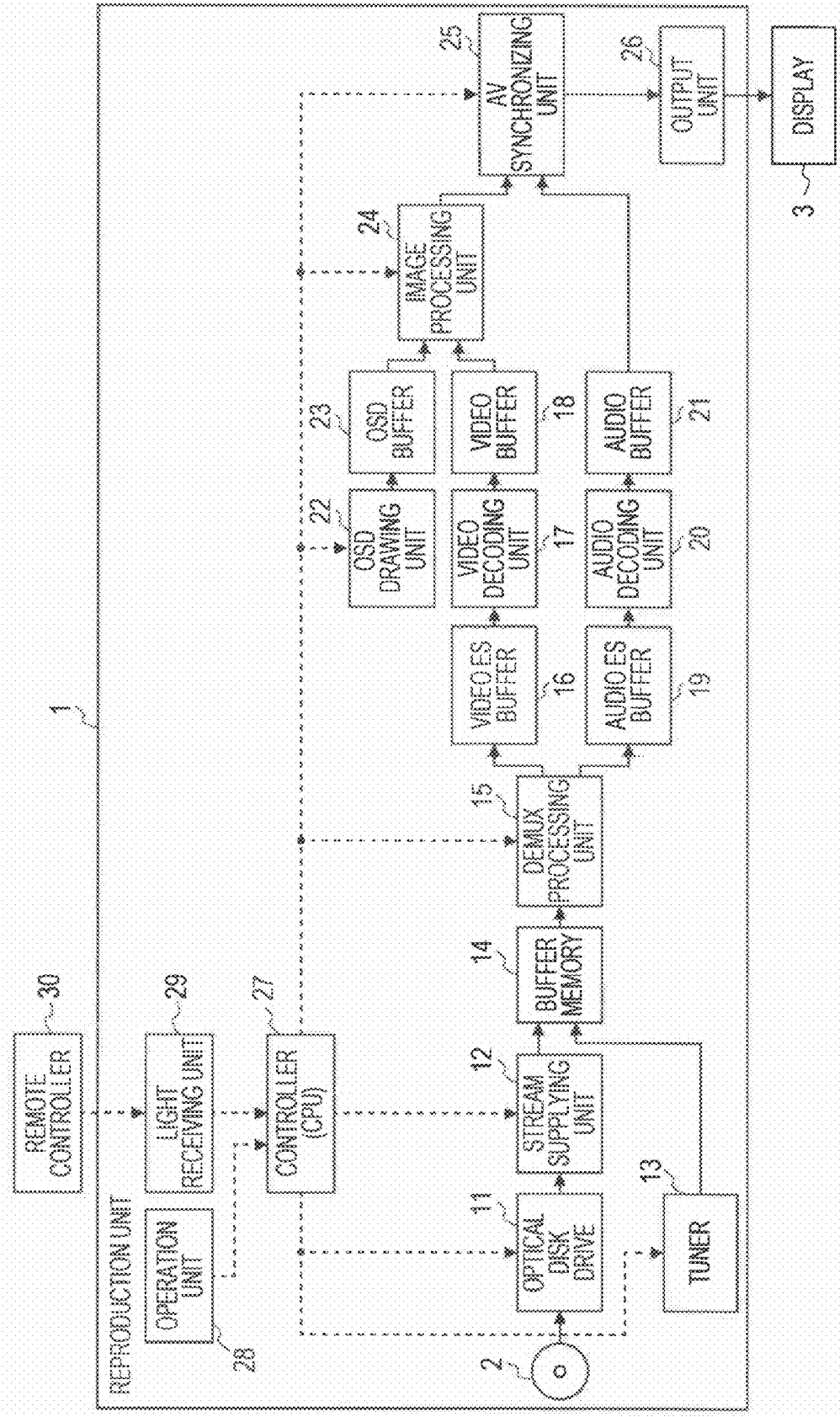
FIG. 1 is a block diagram showing a configuration example of a reproduction unit according to an embodiment of the present disclosure.

FIG. 1 is a block diagram showing a configuration example of a reproduction unit 1 according to an embodiment of the present disclosure.

The reproduction unit 1 is an apparatus that reproduces three-dimensional (3D) content recorded on an optical disc 2 as a content recording medium, and displays a 3D image of the 3D content on an external display 3.

Here, the reproducing the content recorded on the optical disc 2 signifies reproducing of data (content data) of the content, to be precise. However, in the present disclosure, it is referred to as reproducing the content. Further, when 2D content is recorded on the optical disc 2, the reproduction unit 1 obviously reproduces 2D content. In the 2D content (of the 2D image) being an image in the related art, images each corresponding to the left and right eyes are the same, and in the 3D content (of the 3D image), images each corresponding to the left and right eyes are different. That is, the 3D content is three-dimensionally perceived through the parallax between images for the left and right eyes. In FIG. 1, the solid line signifies the flow of content data, and the dotted line signifies the flow of a control signal.

In the present embodiment, it is assumed that the optical disc 2 reproduced by the reproduction unit 1 is, for example, a BD-ROM. Further, the optical disc 2 may be a DVD (Digital Versatile Disc), or Blu-ray disc (registered trademark) other than the BD-ROM. In addition, the reproduction unit 1 may reproduce the 3D content recorded on a semiconductor memory such as flash memory, a hard disk, and the like, other than the optical disc 2. That is, a type of the content recording medium is not particularly limited.

An optical disc drive 11 drives the optical disc 2 under control of a controller 27. A stream supplying unit 12 reads an AV stream of the 3D content as a recording signal recorded on the optical disc 2 that is driven by the optical disc drive 11, and supplies the read AV stream to a buffer memory 14.

A tuner 13 receives, through an antenna not shown, signals of broadcast waves of a frequency band of a prescribed channel determined by the control of the controller 27, and supplies an AV stream of the 3D content, which is obtained as the received result, to the buffer memory 14. The buffer memory 14 holds the AV stream of the 3D content for a predetermined time period, and supplies the AV stream to a Demux processing unit 15.

The Demux processing unit 15 extracts packets such as video data, audio data, subtitle data, and the like based on a PID (Packet ID) of the AV stream supplied from the buffer memory 14. The PID is a unique ID for each type of data constituting the packet, and is applied to the packet.

Next, the Demux processing unit 15 supplies the extracted video data (video ES) to a video ES buffer 16, and supplies the extracted audio data (audio ES) to an audio ES buffer 19. The ES signifies an elementary stream.

The video ES buffer 16 holds the video data supplied from the Demux processing unit 15 for a predetermined time period, and supplies the held video data to a video decoding unit 17. The video decoding unit 17 generates image data of a left eye image (hereinafter, referred to as "L image") and a right eye image (hereinafter, referred to as "R image") by decoding video data encoded in a prescribed encoding scheme such as MPEG2 (Moving Picture Experts Group phase 2), MPEG4, AVC (Advanced Video Coding), and the like. A video buffer 18 holds, for a predetermined time period, the image data of the L image and the R image obtained by being subjected to decoding, and supplies the held image data to an image processing unit 24.

The image data of the 3D content is encoded by, for example, H.264AVC/MVC (H.264 Advanced Video Coding/Multi-view Video Coding), compressed, and recorded, so that the data capacity can be reduced and stored.

In H.264 AVC/MVC, a video stream termed a base view video, and a video stream termed a dependent view video are defined. Hereinafter, H.264AVC/MVC is simply referred to as MVC.

MVC performs encoding not only prediction between images in the time direction, but also prediction between streams (view).

That is, as for the MVC, a prediction encoding that uses other streams as a reference video is not allowed in the base view video, however, a prediction encoding in which the base view video is used as the reference video in the dependent view video is allowed.

Accordingly, as image data of the 3D content, encoding in which the L image is used as the base view video, and the R image is used as the dependent view video is performed. In this case, since the prediction encoding is performed with respect to the R image based on the L image, the data capacity of the dependent view video stream may be reduced in comparison with the data capacity of the base view video stream.

Further, since encoding is performed using H.264AVC, the prediction in the time direction is performed with respect to the base view video. In addition, the prediction in the time direction as well as a prediction between views is performed with respect to the dependent view video. To decode the dependent view video, it is necessary that decoding of a corresponding base view video, as a reference destination, is completed in advance when encoding is performed.

The image data of the 3D content may be recorded on the optical disc 2 as MPEG-TS in which L image and the R image data are different from each other, and may be recorded as single MPEG-TS.

The audio ES buffer 19 holds audio data supplied from the Demux processing unit 15 for a predetermined time period, and supplies the held audio data to the audio decoding unit 20. The audio decoding unit 20 generates sound data by decoding the audio data encoded in a predetermined encoding scheme such as MPEG and the like. The audio buffer 21 holds the sound data obtained by being subjected to decoding, for a predetermined time period, and supplies the held sound data to an AV synchronizing unit 25.

An OSD drawing unit 22 generates an OSD (On Screen Display) image that is displayed to be superimposed on the 3D image of the 3D content, under control of the controller 27, and supplies the generated OSD image to an OSD buffer 23. For example, the OSD drawing unit 22 generates an OSD screen displaying a channel number or the volume, the reproduction time, an OSD screen for displaying the current reproduction position over the 3D content, and the like. The OSD buffer 23 holds the OSD screen (of the image data) generated by the OSD drawing unit 22 for a predetermined time period, and supplies the held OSD screen to the image processing unit 24.

The image processing unit 24 obtains the image data that is held in the video buffer 18 and the OSD buffer 23 under control of the controller 27, and performs a predetermined processing, as necessary, to thereby supply to the AV synchronizing unit 25. As the process performed by the image processing unit 24, a composite processing of the 3D image of the 3D content and the OSD screen, a size conversion processing of the 2D image or the 3D image, and the like are given.

The AV synchronizing unit 25 synchronizes the image data supplied from the image processing unit 24 and the sound data supplied from the audio buffer 21 in accordance with a Presentation Time Stamp (PTS), and supplies the synchronized data to an output unit 26. The PTS is time information for reproduction.

The output unit 26 includes a D/A converter mounted therein, and outputs, to a display 3, the image data supplied from the AV synchronizing unit 25 and the sound data as an analog or digital AV signal. The output unit 26 includes an HDMI output terminal that outputs, for example, the AV signal as the output terminal by a High-Definition Multimedia Interface (HDMI) signal, and an output terminal and the like that outputs the AV signal by a component signal.

The output unit 26 and the connected display 3 is a TV (television) receiver, and the like that includes, for example, a PDP (Plasma Display Panel) display or a liquid crystal display. In the reproducing of the 3D content, the L image and the R image are alternately displayed on the display 3. A viewer (user) views the 3D image of the 3D content while wearing glasses for 3D viewing. The glasses for 3D viewing have a shutter function for alternatingly opening and closing the left and the right, and alternatingly open and close the shutter of each of the left and right eyes by synchronizing the L image and the R image which are displayed on the display 3. A parallax exists between the L image and the R image, and the L image and the R image corresponding to each other are visually recognized, independently in each of the left and right eyes, so that the viewer is able to perceive the image displayed on the display three-dimensionally on the display 3.

The controller 27 controls the reproduction operation of the reproduction unit 1 by a control program recorded on a memory not shown in accordance with an operation instruction from an operation unit 28 or a light receiving unit 29, so that the reproduction image displayed on the display 3 is controlled.

The operation unit 28 includes, for example, a reproduction button for performing reproduction, a stop button for stopping reproduction, and the like, accepts a user's operation, and supplies an operation signal corresponding to the accepted operation to the controller 27. The light receiving unit 29 receives the operation signal supplied from the remote controller 30 with which the reproduction unit 1 is equipped, and supplies the received signal to the controller 27 by an infrared signal.

The remote controller 30 transmits the operation signal corresponding to an operation button operated by a user to the light receiving unit 29 of a main body of the reproduction unit 1 through wireless communication using infrared signals, or the like.

In the remote controller 30, as the operation button relating to reproducing of the 3D content, a reproduction button, a stop button, an FF (Fast-Forward) button, an FR (Fast-Rewind) button, a Next button, a Prev (Previous) button, a Flash + button, a Flash − button, and the like are provided.

Each of the FF button, the FR button, the Next button, the Prev button, the Flash + button, and the Flash − button is a button for executing an interlace operation that enables interlacing images forward or backward by a predetermined number starting from the current point in time to be displayed.

The Next button is a button that moves the reproduction position to the starting position of the next chapter of a chapter being currently reproduced. The Prev button is a button that moves the reproduction position to the starting position of the chapter being currently reproduced, or to the starting position of the previous chapter. The Flash + button is a button that moves the reproduction position to a position further ahead by the number of seconds (for example, 15 seconds) set in advance from the current reproduction position. The Flash − button is a button that moves the reproduction position to a position preceding, by the number of seconds (for example, 10 seconds) set in advance, the current reproduction position. Each of the FF button and the FR button is a button that changes the reproduction position (reproduction image) while being operated (pressed). In contrast, each of the Next button, the Prev button, the Flash + button, and the Flash − button designates a predetermined reproduction position (time) of reproduction contents, and moves the reproduction position at that time. Hereinafter, the Next button, the Prev button, the Flash + button, and the Flash − button are collectively referred to as "Jump keys".

The reproduction unit 1 is configured as above.

[Reproduction Process of Reproduction Unit 1]

In the reproduction unit 1 of FIG. 1, when the FF button, the FR button, and the Jump keys are operated (pressed) so that an image (scene) is significantly changed while the 3D content is reproduced, the 3D content is displayed on a parent screen in terms of the 2D image, so that it is possible to display on a child screen in terms of the 3D image. Further, the parent screen is a screen having a predetermined size within a display screen, and the child screen is a screen having a size smaller than that of the parent screen within the display screen.

Thus, in the reproduction unit 1, when the FF button, the FR button, and the Jump keys are operated while the 3D content is reproduced, the 3D image as well as the 2D image of the 3D content are displayed, so that a user can recognize the 3D image. In addition, in the reproduction unit 1, since the 3D image of the 3D content is displayed on the relatively small child screen in comparison with the parent screen, the parallax amount of the 3D image is reduced in comparison with a case in which the 3D image is displayed on the parent screen, thereby reducing the unease of the user.

Hereinafter, a reproduction process performed by the reproduction unit 1, which includes a process when the FF button, the FR button, the Jump keys are operated (pressed) while the 3D content is reproduced to thereby significantly change an image (scene), will be described with reference to the flowchart of FIG. 2. This reproduction process starts when a BD-ROM as the optical disc 2 is mounted in the optical disc drive 11 or when the reproduction button is operated.

First, in step S1, the controller 27 of the reproduction unit 1 reads an index file recorded on the BD-ROM. Next, in step S2, the reproduction unit 1 determines whether content recorded on the optical disc 2 is 3D content by obtaining information loaded at a predetermined position in the index file.

FIGS. 3A and 3B are diagrams showing the content of data recorded as the index file.

In the BD-ROM, a BDMV directory is present in the root directory, and an index file (index.bdmv file) is located in the BDMV directory.

FIG. 3A shows the data structure of the index file.

In the index file, AppinfoBDMV( ) in which information about contents is recorded is disposed. A data structure of AppinfoBDMV( ) is shown in FIG. 3B.

In the AppinfoBDMV( ) a flag of an item such as SS_content_exist_flag is described. When this flag is "1", the content recorded on the BD-ROM is 3D content. The controller 27 determines whether the content recorded on the optical disc 2 is 3D content, by verifying the flag of the SS_content_exist_flag. In the AppinfoBDMV( ) information about video format (video_format), information about frame rate (frame_rate), and the like are recorded.

Figure 2:
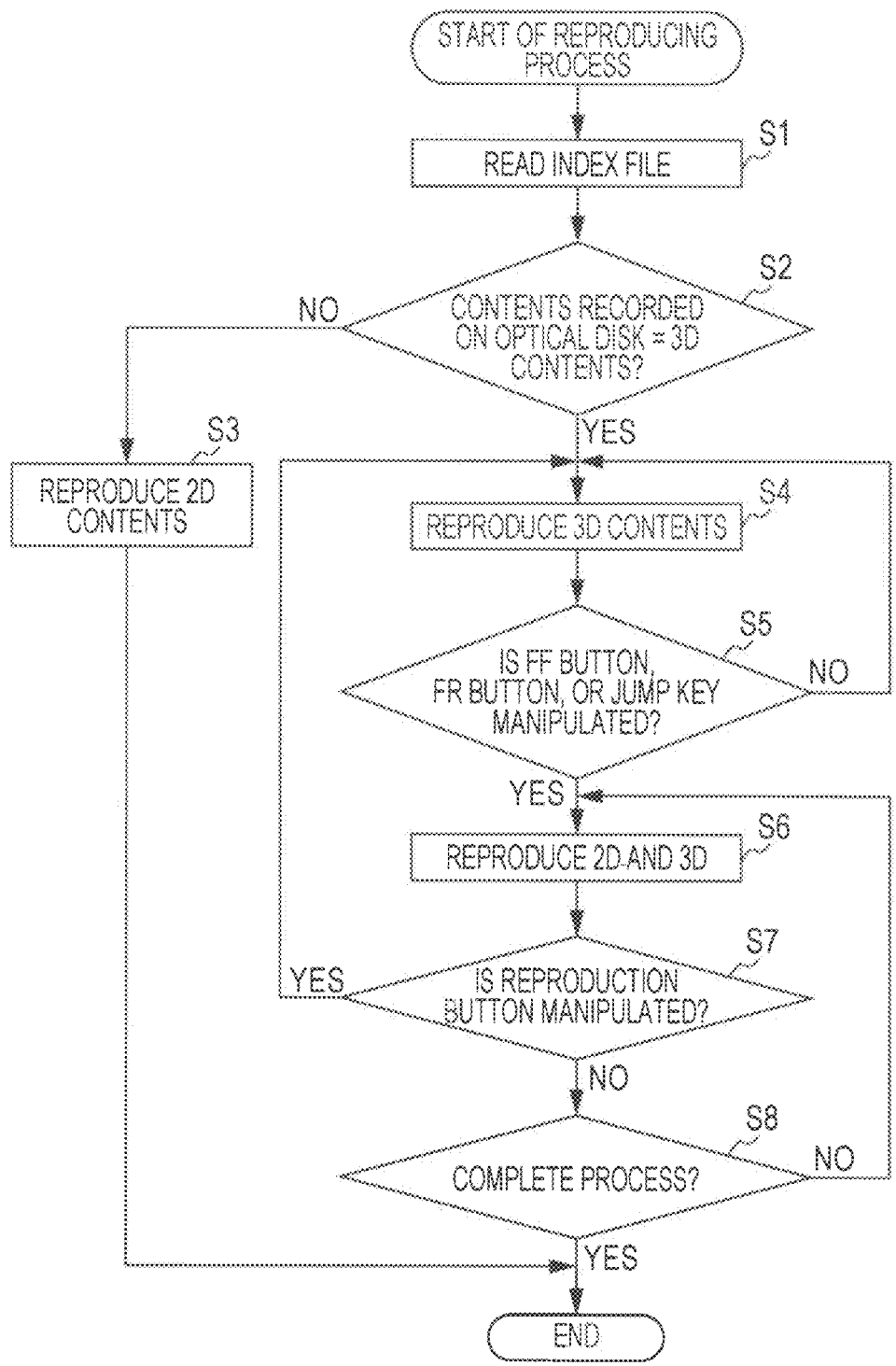
FIG. 2 is a flowchart showing a reproduction process by the reproduction unit of FIG. 1.

Referring to FIG. 2, in step S2, when the content recorded on the optical disc 2 is determined not to be 3D content, the process proceeds to step S3, and the reproduction unit 1 reproduces the 2D content (2D reproduction). Reproduction of all of the recorded 2D content is completed, or the process is completed when the stop button is operated.

Meanwhile, in step S2, when the content recorded on the optical disc 2 is determined to be 3D content, the process proceeds to step S4, and the reproduction unit 1 reproduces the 3D content (3D reproduction).

Hereinafter, a flow of content data in general 3D reproduction will be briefly described.

The AV stream read from the optical disc 2 is supplied to the Demux processing unit 15 through the buffer memory 14. The AV stream is separated into the video ES and the audio ES by the Demux processing unit 15, and the video ES is supplied to the video decoding unit 17 through the video ES buffer 16. In addition, the audio ES is supplied to the audio decoding unit 20 through the audio ES buffer 19. In the video decoding unit 17, the video ES is decoded, and the L image and the R image data is generated. The L image and the R image data is temporarily held in the video buffer 18. In the image processing unit 24, image data of the L image and the R image each with the size of the parent screen is generated from the L image and the R image data that is held in the video buffer 18. In addition, in the audio decoding unit 20, the audio ES is decoded, and sound data is generated. The image data of the L image and the R image each having the size of the parent screen and the sound data are output by the AV synchronizing unit 25 at a predetermined timing in accordance with PTS, so that the L image and the R image are displayed on the display 3, and sound is output.

In step S5 after the reproduction of the 3D content starts, the controller 27 determines whether one of the FF button, the FR button, and the Jump keys is operated (pressed). In step S5, when none of the FF button, the FR button, and the Jump keys are determined to be operated, the process returns to step S4. That is, when none of the FF button, the FR button, and the Jump keys are operated, a general 3D reproduction is continuously performed.

Meanwhile, in step S5, when one of the FF button, the FR button, the Jump keys is determined to be operated, the reproduction unit 1 performs 2D3D reproduction from the current reproduction position of the 3D content in step S6.

Hereinafter, the flow of content data in the 2D3D reproduction will be briefly described.

When one of the FF button, the FR button, and the Jump keys is operated while the 3D content is reproduced, the AV stream is continuously read from the optical disc 2 under control of the controller 27. The read AV stream is supplied to the Demux processing unit 15 through the buffer memory 14. The AV stream is separated into the video ES and the audio ES by the Demux processing unit 15, and the video ES is supplied to the video decoding unit 17 through the video ES buffer 16. In addition, the audio ES is supplied to the audio decoding unit 20 through the audio ES buffer 19. In the video decoding unit 17, the video ES is decoded, and image data of the L image and the R image is generated. The image data of the L image and the R image is temporarily held in the video buffer 18. In the image processing unit 24, image data (hereinafter, referred to as child screen data) of each of the L image and the R image with the size of the child screen, and image data (hereinafter, referred to as parent screen data) of either the L image or the R image with the size of the parent screen are generated from the image data of the L image and the R image that is held in the video buffer 18. In addition, in the audio decoding unit 20, the audio ES is decoded, and sound data is generated. The parent screen data, the child screen data, and the sound data are output by the AV synchronizing unit 25 at a predetermined timing in accordance with PTS, so that the 2D image is displayed on the parent screen on the display 3, and the 3D image is displayed on the child screen. In addition, at the same time, sound is output.

Next, the process proceeds to step S7, and whether the reproduction button is operated is determined by the controller 27. In step S7, when the reproduction button is determined to be operated, the process returns to step S4, and the 3D reproduction re-starts from the current reproduction position.

Meanwhile, in step S7, when the reproduction button is determined not to be operated, the controller 27 determines whether the reproduction is completed in step S8. For example, in a case in which reproduction of all of the 3D content recorded on the optical disc 2 is completed, or in a case in which the stop button is operated, the controller 27 determines the reproduction to be completed, and determines the reproduction to be not completed in other cases. Next, in step S8, when the reproduction is determined to be completed, the process is completed.

Meanwhile, in step S8, when the reproduction is determined not to be completed, the process returns to step S6, so that the reproduction button is operated, or the process ranging from step S6 to step S8 is repeatedly performed until the reproduction is determined to be completed. That is, the reproduction button is operated, or fast-rewinding or fast-forwarding due to the 2D3D reproduction is continuously performed until the reproduction is determined to be completed.

[Example of Display Image]

FIGS. 4A and 4B show examples of an image displayed when the reproduction button is operated, and an image displayed when one of the FF button, the FR button, and the Jump keys is operated.

As shown in FIG. 4A, when the reproduction button is operated, the 3D reproduction is performed, so that a 3D image 51A with the size of the parent screen 51 is displayed on the parent screen 51 within the display screen of the display 3.

Next, when one of the FF button, the FR button, and the Jump keys is operated while the 3D reproduction is performed, 2D3D reproduction is performed from a reproduction position at that time, as shown in FIG. 4B, so that a 2D image 52A with the size of the parent screen 51 is displayed on the parent screen 51, and a 3D image 52B with the size of the child screen 52 is displayed on the child screen 52. Since the size of the 3D image 52B is smaller than that of the 3D image 51A, the parallax amount of the 3D image 52B is less than that of the 3D image 51A. Thus, uneasiness of the user occurring due to the fast-forwarding or fast-rewinding of the 3D image is reduced.

When one of the FF button, the FR button, and the Jump keys is operated, and then the reproduction button is operated again, the 3D reproduction is again performed from the reproduction position at that time, so that the 3D image 51A is displayed on the parent screen 51, as shown in FIG. 4A.

As above, in the reproduction unit 1, when one of the FF button, the FR button, and the Jump keys is operated, the 3D image 52B is displayed on the child screen 52, so that a user can recognize the 3D image even when operating one of the FF button, the FR button, and the Jump keys. In addition, the 3D reproduction may be performed from the reproduction position at that time by again operating the reproduction button after operating one of the FF button, the FR button, and the Jump keys.

As a result, the user searches for a position to sufficiently enjoy the 3D image on the child screen 52 while operating one of the FF button, the FR button, and the Jump keys, and operates the reproduction button, so that the 3D image can be viewed on the parent screen 51 from that position.

[Configuration Example of Computer]

The series of processes described above may be performed by hardware or software. When the series of processes is performed by the software, a program constituting the software is installed on a computer. Here, in the computer, a computer with dedicated hardware built-in, a general-purpose personal computer capable of performing various functions by installing various programs, and the like are included.

Figure 5:
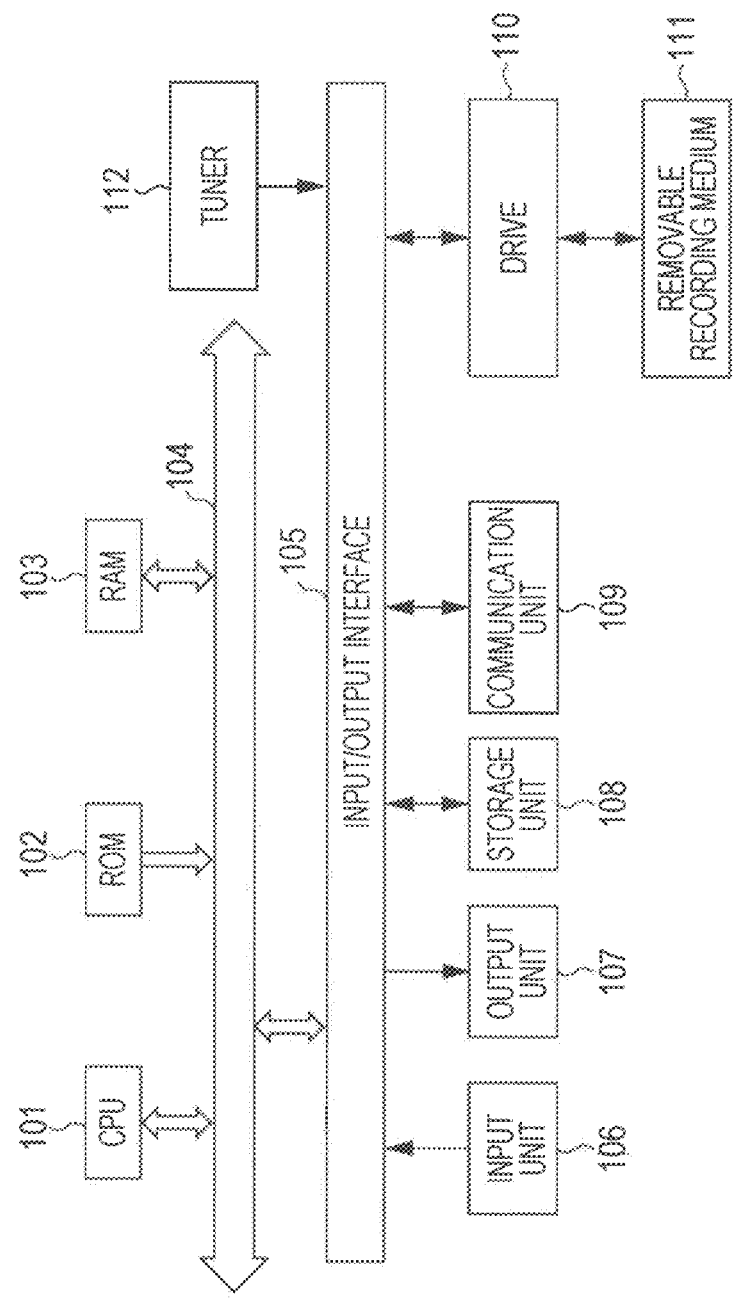
FIG. 5 is a block diagram showing a configuration example of a computer according to an embodiment of the present disclosure.

FIG. 5 is a block diagram showing a configuration example of hardware of the computer for performing the series of processes by the program.

In the computer, a CPU (Central Processing Unit) 101, a ROM (Read Only Memory) 102, and a RAM (Random Access Memory) 103 are connected to each other by a bus 104.

An input/output interface 105 is further connected to the bus 104. An input unit 106, an output unit 107, a storage unit 108, a communication unit 109, and a drive 110 are connected to the input/output interface 105.

The input unit 106 includes a keyboard, a mouse, a microphone, and the like. The output unit 107 includes a display, a speaker, and the like. The storage unit 108 includes a hard disk, a non-volatile memory, or the like. The communication unit 109 includes a network interface, and the like. The drive 110 drives a removable recording medium 111 such as a magnetic disk, an optical disc, a magneto-optical disc, a semiconductor memory, or the like.

A tuner 112 receives a signal of broadcast waves of a predetermined frequency band corresponding to a predetermined broadcast station, and performs supply to the CPU 101 and the like through the input/output interface 105.

In the computer configured as above, a program stored in the storage unit 108 is loaded to the RAM 103 through the input/output interface 105 and the bus 104 to thereby be executed by the CPU 101, so that the series of processes described above is performed.

The program performed by the computer (CPU 101) is recorded on the removable recording medium 111 as package media to thereby be provided. In addition, the program may be provided via a wired or wireless transmission medium such as a Local Area Network, the Internet, and digital satellite broadcasting.

In the computer, the program may be installed in the storage unit 108 through the input/output interface 105 by mounting the removable recording medium 111 in the drive 110. In addition, the communication unit 109 receives the program via the wired or wireless transmission medium, and the received program may be installed in the storage unit 108. Otherwise, the program may be installed in advance in a ROM 102 or the storage unit 108.

Further, the program performed by the computer may be a program in which a process is performed in a chronological manner in accordance with the order described in the present disclosure, in parallel, or a program in which a process is performed at a timing when a call is made.

The embodiments of the present disclosure are not limited to the above described embodiments, and various modifications may be possible without departing from the spirit of the present disclosure.

The present disclosure contains subject matter related to that disclosed in Japanese Priority Patent Application JP 2010-155720 filed in the Japan Patent Office on Jul. 8, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A reproduction unit, comprising:
   circuitry configured to
      reproduce three-dimensional (3D) content recorded on a content recording medium, the 3D content including left-eye image data and right-eye image data, wherein a parallax exists between the left-eye image data and the right-eye image data;
      control displaying either the left-eye image data or the right-eye image data as a two-dimensional (2D) image of the 3D content on a parent screen having a predetermined size within a display screen when an interlace operation is executed with respect to a 3D image of the 3D content during reproduction; and
      reduce the parallax between the left-eye image data and the right-eye image data and control alternately displaying the left-eye image data and the right-eye image data having the parallax reduced as the 3D image of the 3D content on a child screen having a size smaller than the predetermined size within the display screen when the interlace operation is executed.

2. The reproduction unit according to claim 1, wherein the circuitry is configured to control displaying the 3D image of the 3D content on the parent screen when a reproducing operation is executed after the interlace operation.

3. The reproduction unit according to claim 1, wherein the interlace operation includes at least one of an FF button operation, an FR button operation, a Next button operation, a Prev (Previous) button operation, a Flash + button operation, and a Flash − button operation.

4. A reproduction method operated by circuitry that reproduces 3D content recorded on a content recording medium, the 3D content including left-eye image data and right-eye image data, wherein a parallax exists between the left-eye image data and the right-eye image data, the method comprising:
   displaying either the left-eye image data or the right-eye image data as a two-dimensional (2D) image of the 3D content on a parent screen having a predetermined size within a display screen when an interlace operation is executed with respect to a 3D image of the 3D content during reproduction; and
   reducing the parallax between the left-eye image data and the right eye image data and alternately displaying the left-eye image data and the right-eye image data having the parallax reduced as the 3D image of the 3D content on a child screen having a size smaller than the predetermined size within the display screen when the interlace operation is executed.

5. A non-transitory computer-readable medium including a program enabling a computer to function as:
   a reproducing unit that reproduces 3D content recorded on a content recording medium, the 3D content including left-eye image data and right-eye image data, wherein a parallax exists between the left-eye image data and the right-eye image data; and
   a display control unit that
      displays either the left-eye image data or the right-eye image data as a two-dimensional (2D) image of the 3D content on a parent screen having a predetermined size within a display screen when an interlace operation is executed with respect to a 3D image of the 3D content during reproduction by the reproducing unit; and
      reduces the parallax between the left-eye image data and the right-eye image data and alternately displays the left-eye image data and the right-eye image data having the parallax reduced as the 3D image of the 3D content on a child screen having a size smaller than the predetermined size within the display screen when the interlace operation is executed.

6. The reproduction unit according to claim 1, wherein the circuitry is configured to:
   receive an instruction from a device external to the reproduction unit to perform the interlace operation; and
   control displaying the parent screen and the child screen in response to the instruction received from the device external to the reproduction unit.

7. The reproduction unit according to claim 1, wherein the circuitry is configured to:

control displaying only the left-eye image data as the two-dimensional (2D) image of the 3D content on the parent screen when the interlace operation is executed.

8. The reproduction unit according to claim 1, wherein the circuitry is configured to:
control displaying only the right-eye image data as the two-dimensional (2D) image of the 3D content on the parent screen when the interlace operation is executed.

\* \* \* \* \*